United States Patent
Millner

(10) Patent No.: US 11,773,459 B2
(45) Date of Patent: *Oct. 3, 2023

(54) METHOD FOR DIRECT REDUCTION USING VENT GAS

(71) Applicant: Primetals Technologies Austria GmbH, Linz (AT)

(72) Inventor: Robert Millner, Loosdorf (AT)

(73) Assignee: PRIMETALS TECHNOLOGIES AUSTRIA GMBH

( * ) Notice: Subject to any disclaimer, the term of this patent is extended or adjusted under 35 U.S.C. 154(b) by 652 days.

This patent is subject to a terminal disclaimer.

(21) Appl. No.: 16/302,144

(22) PCT Filed: Jun. 8, 2017

(86) PCT No.: PCT/EP2017/063938
§ 371 (c)(1),
(2) Date: Nov. 16, 2018

(87) PCT Pub. No.: WO2017/211939
PCT Pub. Date: Dec. 14, 2017

(65) Prior Publication Data
US 2020/0318206 A1    Oct. 8, 2020

(30) Foreign Application Priority Data
Jun. 9, 2016 (EP) .................................. 16173659

(51) Int. Cl.
*C21B 13/02* (2006.01)
*C21B 13/00* (2006.01)
(Continued)

(52) U.S. Cl.
CPC ........ *C21B 13/0073* (2013.01); *C21B 13/004* (2013.01); *C21B 13/02* (2013.01);
(Continued)

(58) Field of Classification Search
CPC ... C21B 13/004; C21B 13/0073; C21B 13/02; F27B 1/21; F27D 17/008; F27D 2019/0068; Y02P 10/122
(Continued)

(56) References Cited

U.S. PATENT DOCUMENTS 3,836,131 A * 9/1974 Beggs ................. F27D 15/0286
                                                                   266/156
4,188,022 A    2/1980 Beggs et al. .................. 266/195
(Continued)

FOREIGN PATENT DOCUMENTS

CN        1057486 A    1/1992
CN        1330162 A    1/2002
(Continued)

OTHER PUBLICATIONS

NPL: on-line translation of CN 107289667 A, Oct. 2017 (Year: 2017).*
(Continued)

*Primary Examiner* — Jie Yang
(74) *Attorney, Agent, or Firm* — OSTROLENK FABER LLP

(57) ABSTRACT

A method for the direct reduction of feedstock, containing metal-oxide, to form metallic material, by contact with hot reduction gas in a reduction assembly (1): the product of the direct reduction process is discharged from the reduction assembly by a product discharge apparatus, which is flushed with seal gas, drawn off from the vent gas and subsequently dedusted. At least one portion of the dedusted vent gas is used as a combustion energy source during the production of the reduction gas, and/or as a component of a furnace fuel gas during a combustion process for heating the reduction gas, and/or as a component of the reduction gas. Apparatus for carrying out the method is disclosed.

3 Claims, 2 Drawing Sheets

(51) Int. Cl.
*F27B 1/21* (2006.01)
*F27D 17/00* (2006.01)
*F27D 19/00* (2006.01)

(52) U.S. Cl.
CPC .............. *F27B 1/21* (2013.01); *F27D 17/008* (2013.01); *F27D 2019/0068* (2013.01)

(58) Field of Classification Search
USPC .......................................................... 75/488
See application file for complete search history.

(56) References Cited

U.S. PATENT DOCUMENTS

| | | | |
|---|---|---|---|
| 4,605,205 A | 8/1986 | Langner et al. | 266/160 |
| 5,078,787 A | 1/1992 | Becerra-Novoa | 75/443 |
| 5,855,643 A | 1/1999 | Cip | 75/380 |
| 2020/0332377 A1* | 10/2020 | Eder | C21B 13/004 |

FOREIGN PATENT DOCUMENTS

| | | | |
|---|---|---|---|
| CN | 1438331 A * | 8/2003 | |
| CN | 102851426 A | 1/2013 | |
| CN | 105567898 A | 5/2016 | |
| CN | 107289667 A * | 10/2017 | |
| EP | 0 166 679 A1 | 1/1986 | |
| RU | 2122035 C1 | 11/1998 | |
| WO | WO 2008/123962 A1 | 10/2008 | |
| WO | WO 2011/012448 A1 | 2/2011 | |
| WO | WO 2011/012452 A1 | 2/2011 | |

OTHER PUBLICATIONS

International Search Report dated Jul. 3, 2017 in corresponding PCT International Application No. PCT/EP2017/063938.
Written Opinion dated Jul. 3, 2017 in corresponding PCT International Application No. PCT/EP2017/063938.
Russian Federation Notice of Allowance, dated Jan. 14, 2020, issued in corresponding Russian Federation Patent Application No. 2018141398/02(069006). Total 8 pages.
Chinese Office Action, dated Feb. 25, 2020, issued in corresponding Chinese Patent Application No. 201780035567.4. Includes English translation. Total 24 pages.

* cited by examiner

METHOD FOR DIRECT REDUCTION USING VENT GAS

CROSS-REFERENCE TO RELATED APPLICATIONS

The present application is a 35 U.S.C. §§ 371 national phase conversion of PCT/EP2017/063938, filed Jun. 8, 2017, which claims priority of European Patent Application No. 16173659.0, filed Jun. 9, 2016, the contents of which are incorporated by reference herein. The PCT International Application was published in the German language.

TECHNICAL FIELD

The invention relates to a method for direct reduction of metal oxide-containing starting materials to produce metallized material by contact with hot reduction gas in a reduction unit, wherein the product of the direct reduction is discharged from the reduction unit by means of a product discharge device which is flushed with seal gas and from which vent gas is drawn and subsequently de-dusted. The invention, also relates to devices for carrying out the method according to the invention.

PRIOR ART

In order to obtain metals from metal ores, it is necessary to lower the oxygen content in the ores. One method for lowering the oxygen content is so-called "direct reduction", in which a reduction gas is allowed to act on the solid metal ore in a reduction unit. The solid product of the direct reduction is discharged from the reduction unit and can be processed further in different ways, for example it is often hot-compacted, for example briquetted, in order to make it easier to handle, and to reduce its specific surface area in order that the procedure of reoxidation, for example as a result of reacting with atmospheric oxygen or H2O (for example as water vapor), is made more difficult. It is also known, however, to process the solid product further in other units without compaction. It is often the case that the reduction unit in which direct reduction proceeds is a so-called "reduction shaft".

It is basically advantageous to protect the product against reoxidation between discharge from the reduction unit and subsequent devices, for example devices in which the briquetting proceeds, in that it is handled under gas which, with regard to oxidation, is slow-reacting.

Particularly if the reduction gas is under a positive pressure in the reduction unit, it is necessary to ensure that, when removing the product, a simultaneous escape of the generally hot reduction gas is avoided. This occurs for example in that a so-called "seal gas" is introduced into the device by means of which the product is discharged from the reduction unit. As a consequence, this is also referred to as a "product discharge device". The seal gas is slow-reacting or inert with regard to reaction with the product and is under a pressure which is slightly above the pressure of the reduction gas in order, practically, to form a barrier for the escape of the reduction gas.

For iron ores, the product of the direct reduction is referred to for example as "direct reduced iron" (DRI) or "hot direct reduced iron" (HDRI) or "sponge iron" or "iron sponge".

A method for direct reduction of metal oxides to produce metallized material by contact with hot reduction gas which is produced at least in part by catalytic reforming of natural gas, wherein the heat for the endothermic reforming processes which proceed during the reforming is provided at least in part by combustion of a reformer combustion gas, is described for example in FIG. 1 of WO2011012452. It is referred to as a "MIDREX® method". In such a MIDREX® method, the product is discharged from the reduction shaft, which is under elevated pressure, by means of a product discharge device. In this case, the product discharge device comprises a discharge member and a material-conveying device which is under a positive pressure, which is lower in comparison with the reduction shaft, or not under a positive pressure. A corresponding material-conveying device is, for example, often referred to as a "product discharge chamber" (PDC). For the purpose of sealing, that is, for the purpose of preventing hot reduction gas from exiting the reduction shaft, use is made of slow-reacting seal gas, which is also often referred to as "bottom seal gas" (BSG) since it is intended to seal off the bottom end of the reduction shaft. This is shown for example in WO2008123962 and U.S. Pat. No. 4,188,022. The product discharge device is said to be flushed with the seal gas. In a MIDREX® plant, use is often made of dried flue gas from a reformer of a MIDREX® plant, which consists of approximately 80% nitrogen and approximately 20% carbon dioxide and is correspondingly slow-reacting with regard to oxidation of HDRI, as the BSG gas.

The BSG flows through the material column in the discharge member, this being in the present example a material discharge tube filled with HDRI, also referred to as a "dynamic seal leg", mostly from the point of introduction in the direction of the PDC and to a lesser extent in the direction of the reduction shaft. A large part of the BSG therefore flows into the PDC and has to be diverted therefrom. During the diversion from the PDC, the BSG, then referred to as "vent gas", is laden with dust from the product of the direct reduction. The greater the amount of product of the direct reduction which is discharged by way of the PDC as dust, the less economical the direct reduction method is, since the dust cannot be used, or can be used only with increased effort, for, for example, steel production.

Within the context of this application, the term "vent gas" generally means "seal gas" which is drawn from a product discharge device and not only seal gas which is diverted from the PDC of a MIDREX® method. The problem of dust being carried in seal gas always exists if seal gas flows through product of the direct reduction.

Owing to reactions proceeding between hot DRI—also referred to as "hot direct reduced iron" (HDRI) or "hot iron sponge"—and carbon dioxide, and owing to outgassing of the hot iron sponge, the vent gas can also contain traces of carbon monoxide (CO).

Release of the vent gas into the environment necessitates de-dusting. De-dusting of the vent gas, which normally takes place in wet form, requires sufficient dilution with infiltrated air in order, for example, to reduce the temperature or in order to drop below explosion limits of the dust in the vent gas.

Owing to reactions proceeding between hot DRI and carbon dioxide, and owing to outgassing of the hot iron sponge, the vent gas can also contain carbon monoxide (CO). Release of the vent gas into the environment necessitates corresponding dilution with air—also referred to as "infiltrated air". However, large quantities of infiltrated air have to be introduced for this purpose, and this is demanding in terms of apparatus and energy-intensive and causes large quantities of gas to be released into the environment.

Use of dust-laden vent gas under thermal reaction with oxygen-containing gases is difficult owing to the high dust content. By contrast, use of de-dusted vent gas under thermal reaction with oxygen-containing gases, which vent gas is diluted with infiltrated air, can lead to undesirable high NOx emissions and likewise necessitates a high outlay in terms of apparatus.

SUMMARY OF THE INVENTION

Technical Problem

It is the object of the present application to provide a method and a device which allow the difficulties mentioned above to be overcome and allow use of de-dusted vent gas.

Technical Solution

The object is achieved by a method for direct reduction of metal oxide-containing, preferably iron oxide-containing, starting materials to produce metallized material by contact with hot reduction gas in a reduction unit, wherein the product of the direct reduction is discharged from the reduction unit by means of a product discharge device which is flushed with seal gas and from which vent gas is drawn and subsequently de-dusted. This is characterized in that at least part of the de-dusted vent gas is used as an energy source during combustion for producing the reduction gas by catalytic reforming, and/or as a component of a furnace combustion gas of combustion for heating the reduction gas, and/or as a component of the reduction gas.

Advantageous Effects of the Invention

Preferably, the metal oxides are iron oxides. However, according to the Richardson-Jeffes diagram, it is furthermore also possible for, for example, oxidic ores of nickel, copper, lead and cobalt to be reduced.

The method for direct reduction may be for example a method according to the type MIDREX® with catalytic reforming of hydrocarbons for producing a reduction gas, wherein the reduction gas is produced at least in part by catalytic reforming of a mixture of gaseous hydrocarbons, wherein the heat for the endothermic reforming processes which proceed during the reforming is provided at least in part by combustion of a reformer combustion gas, as described for example in WO2011012448 and WO2011012452, whose full disclosure, especially with regard to the reforming, is encompassed by the present invention and is incorporated by reference herein. However, the method for direct reduction may also be, for example, a direct reduction method on the basis of coal gasification or a smelting-reduction plant, for example in a COREX® DR combined system. In these cases, prior to being introduced into the reduction unit, the reduction gas can be heated in a reduction gas furnace to a temperature which is favorable for the desired chemical reactions. Seal gas can be obtained from the reduction gas furnace for heating the reduction gas since, in comparison with the MIDREX® method, a corresponding reformer is not present as a source.

Catalytic reforming of hydrocarbons for producing a reduction gas is known and is described for example in WO2011012448 and WO2011012452, whose full disclosure, incorporated by reference herein, especially with regard to the reforming, is encompassed by the present invention. According to the invention, in such a method, the de-dusted vent gas is used as an energy source during combustion for producing the reduction gas by catalytic reforming. This is because the heat for the endothermic reforming processes which proceed during the reforming is provided by combustion. The de-dusted vent gas can be admixed to the reformer combustion gas before the latter enters the combustion chamber of the reformer and combusts. However, it can itself be introduced directly into the combustion chamber of the reformer too, wherein its combustible components are combusted in the combustion chamber of the reformer, which, with regard to the reformer combustion gas, is usually supplied superstoichiometrically with oxygen (O2), for example from air.

If the reduction gas is heated in a reduction gas furnace prior to entering the reduction unit, this generally occurs by combustion of a furnace combustion gas. According to the invention, the de-dusted vent gas is used as a component of the furnace combustion gas. In this way, said vent gas is used as an energy source in the reduction gas furnace.

The product of the direct reduction of iron oxide-containing starting materials, DRI or HDRI, is preferably hot-briquetted, for example processed to form hot briquetted iron (HBI). However, it can also be discharged in the hot state from the reduction shaft and used directly in a steelworks, for example by being added in a hot state into an electric arc furnace. The degree of metallization is the ratio between metallic iron and total iron in the HBI and is 88% for HBI. According to current International Maritime Organization (IMO) regulations, the density of HBI is 5 kg/dm$^3$. The density of the hot-briquetted briquetting product may also be below this density, for example if production is carried out from particular raw materials or for particular purposes.

In the case of hot-briquetting, a briquet can be produced directly, or else strands can be produced, which are also referred to as "slugs", which either break themselves or are broken into smaller pieces by means of breakers, can be produced.

The iron sponge is delivered for example by means of a product discharge chamber (PDC) from the reduction unit to the devices in which the briquetting proceeds. As explained in the corresponding preceding passages of the introduction to the prior art, the product discharge device is charged with seal gas, that is, seal gas is introduced into the product discharge device, and vent gas is drawn from the product discharge device. If there is no change to the composition of the seal gas in the product discharge device, the composition of the vent gas corresponds to the seal gas. In comparison with the seal gas introduced, the vent gas is more heavily laden with dust from the product.

In the method according to the invention, the vent gas is de-dusted in wet form.

At least part of the de-dusted vent gas or the entire de-dusted vent gas is used according to the invention. Reformer combustion gas of a reformer for producing reduction gas, furnace combustion gas and reduction gas contain not only the component of the de-dusted vent gas but also one or more other components. The de-dusted vent gas is added to a combustion process for producing the reduction gas by catalytic reforming, or to the furnace combustion gas, or to the reduction gas. De-dusted vent gas is added not upstream of the reformer into a gas to be reformed, which cannot yet be referred to as a "reduction gas", but downstream of the reformer into the product gas of the reforming. Product gas and de-dusted vent gas are then two components of the reduction gas.

In use according to the invention, use can be made of a calorific value or a reduction force of the vent gas, and the vent gas is not released into the environment, and so problems with regard to related limit values for the vent gas are not relevant.

In comparison with conventional wet de-dusting, significantly smaller quantities of gas have to be handled in the method according to the invention because, in the de-dusting according to the invention, dilution with infiltrated air does not take place prior to the de-dusting step, in a conventional method, for example following a MIDREX® direct reduction, the dust-laden vent gas is diluted to approximately 10-30 times the volume. Since the vent gas used according to the invention is not diluted with infiltrated air, it is not necessary to design plant parts according to large gas quantities obtained during dilution. Moreover, the problem of the formation of NOx as a result of nitrogen introduction by infiltrated air is reduced since no infiltrated air for dilution is supplied.

Preferably, the addition of de-dusted vent gas to other components of the reformer combustion gas or reduction gas is realized in a regulated manner in dependence on its composition and/or its flow (composition and flow of the de-dusted vent gas). The flow is defined for example in Nm3/h. For example, these parameters can be measured and used for precalculation and regulation of the combustion in the combustion chamber of the reformer or in the reduction gas furnace. For combustion in the combustion chamber of the reformer, it is favorable that the combustion chamber of the reformer or burners in the combustion chamber of reformers are generally already constructed and operated such that the formation of NOx is minimized. Combustion of de-dusted vent gas is thus realized there with reduced NOx formation.

During the wet de-dusting of the vent gas, the vent gas is cooled to approximately 30-50° C. The de-dusted vent gas is subsequently compressed in order firstly to compensate for pressure losses when it is passed on, and secondly to set a pressure which the desired use necessitates. The pressure during exit from a compressor may in this case be regulated to desired values.

A further subject of the present application is a device for carrying out a method according to the invention. It comprises:
- a reduction unit with a reduction gas supply for supplying reduction gas to the reduction unit,
- a reformer for producing reduction gas by catalytic reforming of gaseous hydrocarbons, from which the reduction gas supply departs,
- a reformer combustion gas supply line for supplying reformer combustion gas to a combustion chamber of the reformer,
- a product discharge device,
- a seal gas supply line opening into the product discharge device,
- a vent gas removal line departing from the product discharge device. In the invention, the vent gas removal line opens into a wet de-dusting device, from which at least one diverting device departs for diverting de-dusted vent gas into
- the reformer combustion gas supply line and/or
- the combustion chamber of the reformer.

The gaseous hydrocarbons which are reformed are often supplied at least partially with natural gas.

A further subject of the present invention is a device for carrying out a method according to the invention. The device comprises:
- a reduction unit with a reduction gas supply for supplying reduction gas to the reduction unit,
- a reduction gas furnace in the reduction gas supply, into which opens a furnace combustion gas supply,
- a product discharge device,
- a seal gas supply line opening into the product discharge device,
- a vent gas removal line departing from the product discharge device. The vent gas removal line opens into a wet de-dusting device, from which at least one diverting device departs for diverting de-dusted vent gas into the furnace combustion gas supply.

A further subject of the present invention is a device for carrying out a method according to the invention. It comprises
- a reduction unit with a reduction gas supply for supplying reduction gas to the reduction unit,
- a product discharge device,
- a seal gas supply line opening into the product discharge device,
- a vent gas removal line departing from the product discharge device. The vent gas removal line opens into a wet de-dusting device, from which at least one diverting device departs for diverting de-dusted vent gas into the reduction gas supply for supplying reduction gas to the reduction unit.

The reduction unit is for example a reduction shaft in which raw material is introduced at the top and product is discharged at the bottom. Reduction by means of reduction gas is realized during the passage through the shaft from the top downward following gravitational force. Such a reduction shaft is operated for example in a MIDREX® method with reduction gas under a pressure of 0.03-0.3 $MPa_g$ (positive pressure in comparison with the atmospheric pressure of the environment).

The product discharge device comprises, for example, a discharge member and a material-conveying device. These may in this case be for example a material discharge tube with the connection of a seal gas supply line, and for example a cellular wheel conveyor.

In a MIDREX® method, the material-conveying device is, in comparison with the atmospheric pressure of the environment, under a positive pressure, which is lower in comparison with the reduction shaft, or not under a positive pressure. As already described in the introduction, a corresponding material-conveying device is usually referred to as a "product discharge chamber" (PDC) in a MIDREX® method. A discharge member is, in connection with the MIDREX® method, often referred to as a "dynamic seal leg" (see WO2008123962) or "dynamic gas seal".

The vent gas removal line may depart, for example, from the PDC.

The vent gas removal line opens into a wet de-dusting device.

The invention is therefore directed to a device for carrying out a method disclosed herein, which comprises:
- a reduction unit (1) with a reduction gas supply (2) for supplying reduction gas to the reduction unit,
- a product discharge device (3),
- a seal gas supply line (4) opening into the product discharge device (3),
- a vent gas removal line (5) departing from the product discharge device, and optionally at least one member of the group consisting of the members a, b, c defined below:

a)
- a reformer (8) for producing reduction gas by catalytic reforming of gaseous hydrocarbons, from which the reduction gas supply (2) departs, a reformer combustion gas supply line (9) for supplying reformer combustion gas to a combustion chamber (12) of the reformer (8), b)
a reduction gas furnace (10) in the reduction gas supply (2), into which a furnace combustion gas supply (11) opens, wherein the vent gas removal line (5) opens into a wet de-dusting device (6), from which at least one diverting device (7) departs for diverting de-dusted vent gas into at least one member of the group consisting of the members d, e, f d)
the reformer combustion gas supply line (9)
and/or
the combustion chamber of the reformer (8)

e)
the furnace combustion gas supply (11)

f)
the reduction gas supply (2) for supplying reduction gas to the reduction unit.

Preferably, the devices according to the invention comprise at least one control device for adding de-dusted vent gas into the reformer combustion gas supply line and/or the combustion chamber of the reformer and/or
the furnace combustion gas supply and/or
the reduction gas supply,
preferably in dependence on the composition and/or the flow of the de-dusted vent gas.

BRIEF DESCRIPTION OF THE DRAWINGS

The present invention will be explained on the basis of embodiments with reference to the following schematic exemplary figures.

DESCRIPTION OF THE EMBODIMENTS

Figure 1:
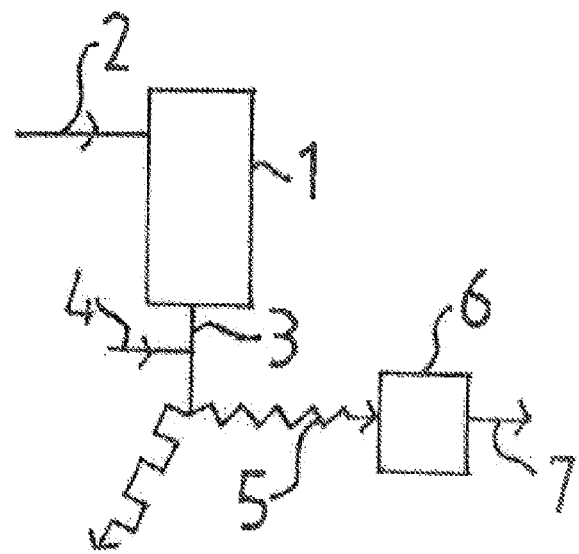
FIG. 1 shows an embodiment of a device according to the invention.

FIG. 1 schematically shows some aspects of a device for carrying out a method according to the invention. It comprises a reduction unit 1 with a reduction gas supply 2 through which hot reduction gas is guided into the reduction unit 1. For a better overview, the illustration of the introduction of metal oxide-containing starting materials, as raw material, into the reduction unit has been omitted. Departing from the reduction unit 1 is a product discharge device 3 by way of which the product of the direct reduction is discharged from the reduction unit 1. Opening into the product discharge device 3 is a seal gas supply line 4 through which seal gas is introduced into the product discharge device in order to flush the latter with seal gas. Departing from the product discharge device 3 is a vent gas removal line 5, which is illustrated by a zigzag arrow. Vent gas from the product discharge device 3 is guided out through the vent gas removal line 5. If the product discharge device comprises for example a discharge member and a material-conveying device (these not being additionally illustrated here), it is possible for seal gas to be introduced into the discharge member, which seal gas, in part, flows into the material-conveying device and is guided out of the latter as vent gas. The material-conveying device could be for example a cellular wheel conveyor or a wiper bar. Discharged product is indicated by a cornered arrow. The vent gas removal line 5 opens into a wet de-dusting device 6 in which the vent gas is de-dusted. A diverting device 7 for diverting de-dusted vent gas departs from the wet de-dusting device 6. The following figures explain in more detail where the diverting device 7 can open into.

Figure 2:
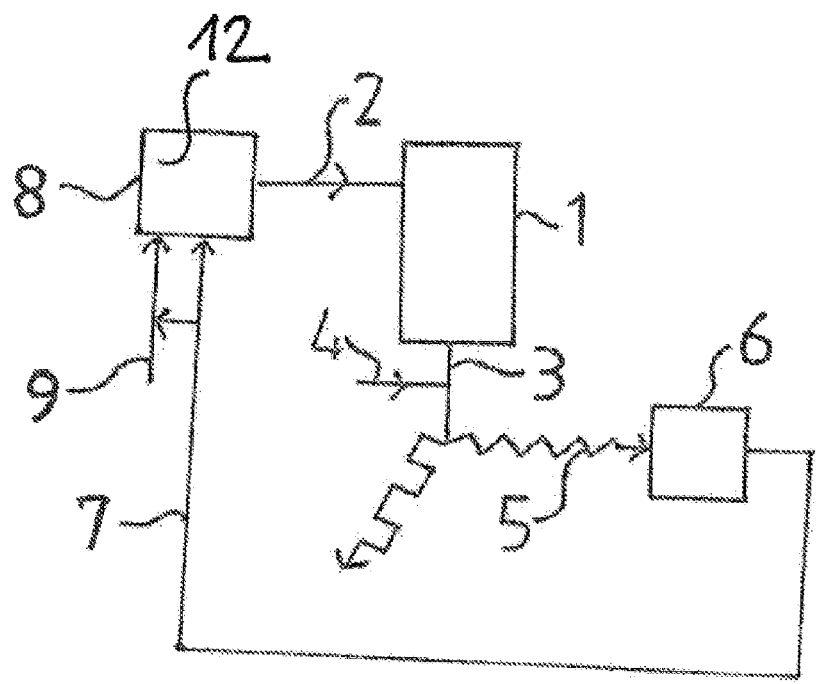
FIG. 2 shows an embodiment of a device according to the invention, in which catalytic reforming is carried out, for example, in the manner of a MIDREX® method.

FIG. 2 schematically shows a device in which a reformer 8 for producing reduction gas by catalytic reforming of natural gas, for example according to the MIDREX® method, is present. The reduction gas supply line 2 departs from the reformer. Reformer combustion gas is provided to the combustion chamber 12 of the reformer 8 via the reformer combustion gas supply line 9. For a better overview, the illustration of the supply of natural gas to the reformer 8 is omitted. Parts already explained on the basis of FIG. 1 are not discussed. The diverting device 7 opens into the reformer combustion gas supply line 9 and the combustion chamber 12 of the reformer 8. De-dusted vent gas can consequently be introduced into the combustion chamber 12 of the reformer 8, or admixed to the reformer combustion gas, in order to serve as an energy source during the combustion for producing the reduction gas by catalytic reforming.

Figure 3:
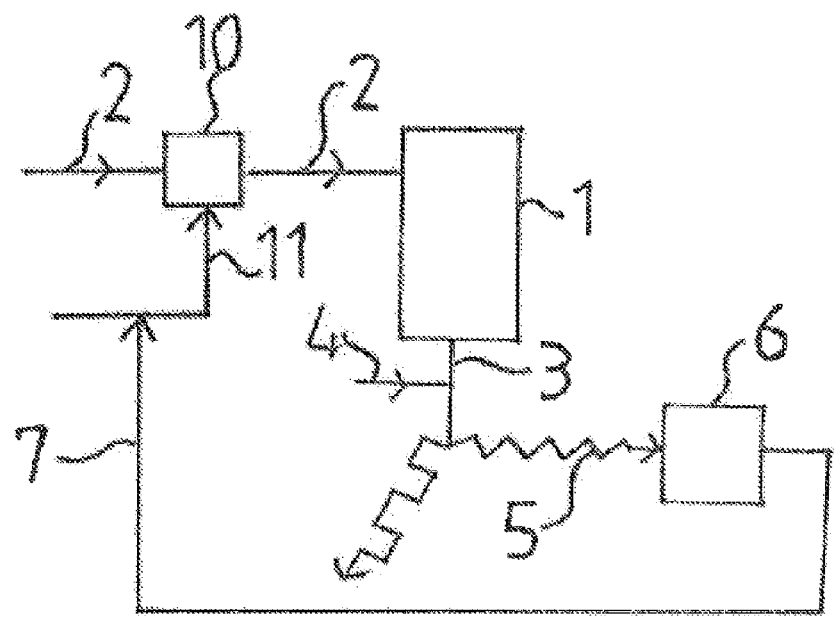
FIG. 3 shows an embodiment of a device according to the invention, in which reduction gas comes from a coal gasification plant or from a COREX® part of a COREX® DR plant.

FIG. 3 schematically shows a device in which a reduction gas furnace 10 is present in the reduction gas supply 2. The reduction gas may come for example from a coal gasification plant or from a COREX® part of a COREX® DR plant. Furnace combustion gas is provided via the furnace combustion gas supply 11. Parts already explained on the basis of FIG. 1 are not discussed. The diverting device 7 opens into the furnace combustion gas supply 11. De-dusted vent gas can consequently be used as a component of the furnace combustion gas during combustion for heating the reduction gas.

Figure 4:
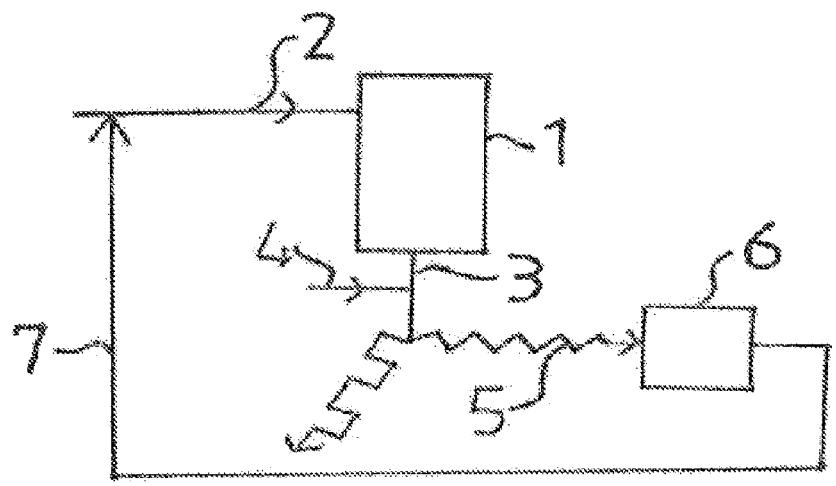
FIG. 4 shows a further embodiment of the device according to the invention.

FIG. 4 schematically shows a device in which the diverting device 7 opens into the reduction gas supply 2. De-dusted vent gas can consequently serve as a component of the reduction gas which is introduced into the reduction unit 1. The reduction gas supply can depart for example from a reformer, as in FIG. 2. Thus, the de-dusted vent gas is not guided upstream of the reformer into a gas to be reformed, but is guided downstream of the reformer into the product gas of the reforming. The mixture of the product gas with the de-dusted vent gas thus forms, in FIG. 4, the reduction gas consisting of these two components. The reduction gas supply, as indicated in FIG. 3, a coal gasification plant or the COREX® part of a COREX® DR plant may also serve as a source for other components of the reduction gas.

A CO2 removal plant may also be present in the reduction gas supply in order also for the CO2 content to be reduced prior to its introduction into the reduction unit.

In all the figures, it is possible for a control device for adding de-dusted vent gas into the reformer combustion gas supply line and/or the combustion chamber of the reformer, or the furnace combustion gas supply, or the reduction gas supply, in dependence on the composition and/or the flow of the de-dusted vent gas to be present. This is not additionally illustrated, however, for the purpose of a better overview.

Even though the invention has been illustrated and described in more detail by way of the preferred exemplary embodiments, the invention is not restricted by the examples disclosed, and other variations may be derived therefrom by a person skilled in the art without departing from the scope of protection of the invention.

The disclosure of the present application also encompasses the entire disclosure of WO08123962, U.S. Pat. No. 4,188,022, WO2011012448 and WO2011012452 and each of them is incorporated by reference herein.

LIST OF CITATIONS

Patent Literature

WO2011012452
WO08123962
U.S. Pat. No. 4,188,022
WO2011012448

LIST OF REFERENCE SIGNS

1 Reduction unit
2 Reduction gas supply
3 Product discharge device
4 Seal gas supply line
5 Vent gas removal line
6 Wet de-dusting device
7 Diverting device
8 Reformer
9 Reformer combustion gas supply line
10 Reduction gas furnace
11 Furnace combustion gas supply
12 Combustion chamber

The invention claimed is:

1. A method for direct reduction of metal oxide-containing starting materials to produce metallized material by contact with hot reduction gas in a reduction unit that receives the reduction gas, the method comprising:

discharging the product of the direct reduction from the reduction unit by a product discharge device;

flushing the product discharge device with seal gas to produce vent gas, the seal gas being slow-reacting or inert with respect to reaction with the metallized material and is under a pressure which is above the pressure of the reduction gas in order, practically, to form a barrier for escape of the reduction gas;

drawing off the vent gas from the product discharge device, the vent gas containing seal gas and carbon monoxide (CO);

wet de-dusting the vent gas; and a) introducing, directly or indirectly, at least part of the dedusted vent gas into a combustion chamber of a catalytic reformer that produces the hot reduction gas, so that the introduced dedusted vent gas serves as an energy source during combustion for producing the reduction gas by catalytic reforming; or b) supplying at least part of the dedusted vent gas to a furnace that heats the reduction gas to serve as a component of the furnace combustion gas during combustion that heats the reduction gas, or c) adding at least part of the dedusted vent gas to the product gas produced by a reformer as a component of the reduction gas received by the reduction unit before the reduction gas is received by the reduction unit, or d) a) and b), or e) a) and c), or f) b) and c), or g) a), b) and c).

2. The method as claimed in claim 1, comprising adding de-dusted vent gas to other components of the reformer combustion gas or reduction gas is realized in a regulated manner dependent on its composition and/or its flow of the de-dusted vent gas.

3. The method as claimed in claim 1, wherein the method is direct reduction of iron starting materials.

* * * * *